Figure 1:
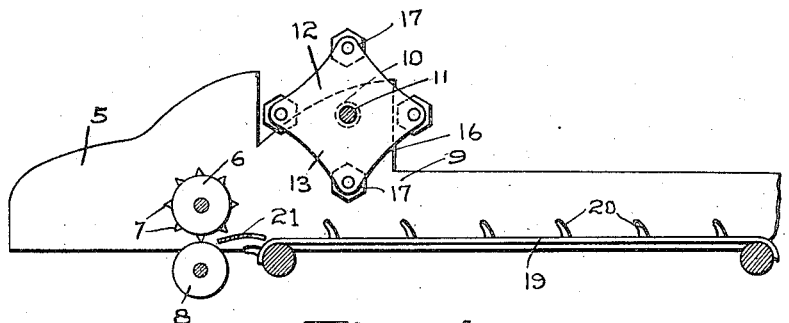

R. GRIMM AND E. F. RHODE.
CUTTING MECHANISM.
APPLICATION FILED SEPT. 21, 1920.

1,384,060.

Patented July 12, 1921.

RICHARD GRIMM
E. F. RHODE, Inventors.

Witness

By Attorneys

UNITED STATES PATENT OFFICE.

RICHARD GRIMM AND ERWIN F. RHODE, OF TWO RIVERS, WISCONSIN.

CUTTING MECHANISM.

1,384,060.   Specification of Letters Patent.   Patented July 12, 1921.

Application filed September 21, 1920. Serial No. 411,857.

*To all whom it may concern:*

Be it known that we, RICHARD GRIMM and ERWIN F. RHODE, citizens of the United States, residing at Two Rivers, in the county of Manitowoc and State of Wisconsin, have invented a new and useful Cutting Mechanism, of which the following is a specification.

This invention relates to feed chopping machines, and more particularly to the construction of the reel employed in connection with the feeding mechanism of the machine.

The object of the invention is to provide a novel form of reel employed in connection with the machine, the reel having rollers supported thereon at the respective corners thereof, which rollers are provided with flat surfaces to contact with the hay or other material fed into the machine associated therewith, thereby eliminating any possibility of the material winding around the reel to clog the machine.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 2:
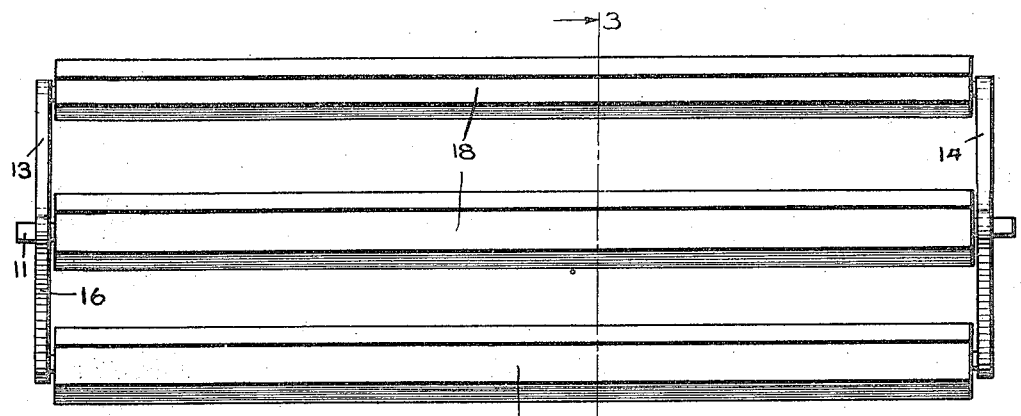
Figure 3:
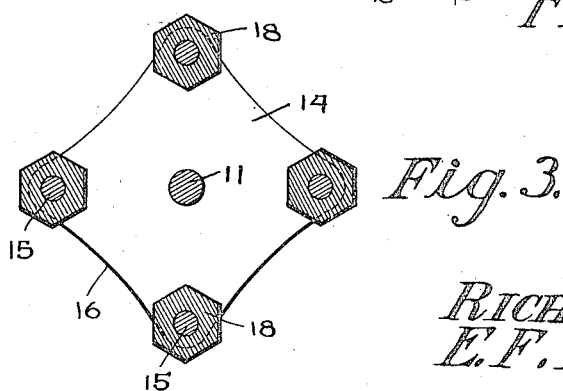

Figure 1 illustrates a longitudinal sectional view through the feeding device of a feed chopping machine, Fig. 2 illustrates a side elevational view of the reel; and Fig. 3 illustrates a sectional view taken on line 3—3 of Fig. 1.

Referring to the drawing in detail, the reference character 5 designates a portion of the frame of the cutting machine, which has the cutting roll 6 supported thereby, the cutting roll being provided with suitable longitudinal knives 7, coöperating with the roll 8, which is supported thereunder, for cutting material such as hay, corn, or the like into relatively small pieces.

The frame also includes spaced side members 9 which are provided with suitable bearings 10 for accommodating the shaft 11 of the reel 12 which forms an important feature of the invention. This reel 12, includes opposed end sections 13 and 14 which are connected by the rods 15, the end sections having curved surfaces 16 to provide the extension 17 at the respective corners thereof, which extensions provide bearings for the relatively small rollers 18, which operate between the end sections 13 and 14.

The rollers 18, are of particular constructions, the same being substantially octagonal in cross section to provide relatively flat surfaces to contact with the material to be cut, to insure the operation of the rollers to accomplish the feeding result. In connection with the reel 12, it might be stated that the rollers carried thereby, are of constructions so that the same will revolve freely in their bearings to permit material contacting therewith, to pass thereover.

Operating under the reel, is the usual endless conveyer indicated at 19, which conveyer carries the hooked shaped fingers 20 which are disposed on the conveyer in spaced relation with each other, and inclined toward the reel 12, so that the fingers will pick up material at the outer or free end of the conveyer, and move the same toward the reel and deliver it to the cutting rolls 6.

At the forward end of the conveyer is located a guard 21, which guard is provided with cut out portions to permit the fingers 20 to pass therethrough, the guard acting as a release for releasing the hay or material under operation from the fingers, so that the same may be delivered to the chopping or cutting rolls, as heretofore described.

In the operation of the device, it is obvious that if the cutting rolls become clogged, so that the same will not operate to accomplish the cutting operation, the hay or material which contacts with the reel will be caused to remain stationary, the rollers 18 revolving in their bearings to relieve the reel proper of the strain directed thereto by the weight of the hay piling on the reel.

It is of course understood however that the reel is operated by any suitable means not shown, to bring the grain into engagement with the conveyer to efficiently accomplish the feeding thereof.

Having thus described the invention, what is claimed as new is:—

In a cutting machine, a frame, cutting means carried by the frame, a conveyer operating on the frame, a reel supported above the conveyer, said reel comprising end sections, rollers mounted to revolve between the end sections, and each of said rollers having flat surfaces.

In testimony that we claim the foregoing as our own, we have hereto affixed our signatures in the presence of two witnesses.

RICHARD GRIMM.
ERWIN F. RHODE.

Witnesses:
F. W. DICKE,
GEO. H. DICKE.